Figure 1:
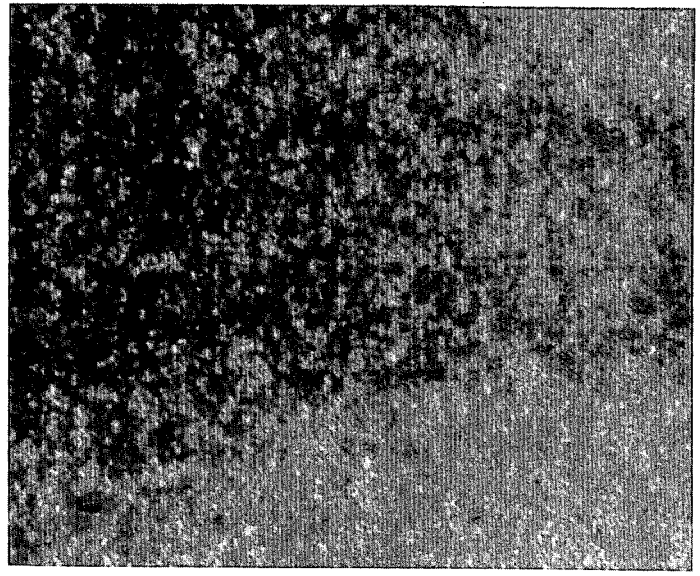

United States Patent [19]

Brun et al.

[11] Patent Number: 4,539,141

[45] Date of Patent: Sep. 3, 1985

[54] MICROCOMPOSITE OF METAL CARBIDE AND CERAMIC PARTICLES

[75] Inventors: Milivoj K. Brun, Ballston Lake; Minyoung Lee; Lawrence E. Szala, both of Schenectady, all of N.Y.

[73] Assignee: General Electric Company, Schenectady, N.Y.

[21] Appl. No.: 630,905

[22] Filed: Jul. 13, 1984

Related U.S. Application Data

[62] Division of Ser. No. 529,783, Sep. 6, 1983, Pat. No. 4,515,746.

[51] Int. Cl.³ ............................................. C04B 35/56
[52] U.S. Cl. ..................... 252/516; 51/307; 51/309; 252/518; 501/87; 501/96
[58] Field of Search ............... 501/87, 96; 51/307, 51/309; 252/516, 518

[56] References Cited

U.S. PATENT DOCUMENTS

| | | | |
|---|---|---|---|
| 3,886,254 | 5/1975 | Tanaka | 501/87 |
| 4,042,656 | 8/1977 | Chviruk et al. | 501/87 |
| 4,063,908 | 12/1977 | Ogawa et al. | 501/87 |
| 4,110,260 | 8/1978 | Yamamoto et al. | 501/87 |
| 4,186,022 | 1/1980 | Ordanian et al. | 501/87 |
| 4,218,253 | 8/1980 | Dworak et al. | 501/87 |
| 4,356,272 | 10/1982 | Kanemitsu et al. | 501/87 |
| 4,379,852 | 4/1983 | Watanabe et al. | 501/87 |
| 4,407,968 | 10/1983 | Lee et al. | 501/87 |

Primary Examiner—Mark L. Bell
Attorney, Agent, or Firm—Jane M. Binkowski; James C. Davis, Jr.; James Magee, Jr.

[57] ABSTRACT

A particulate mixture of ceramic powder, free carbon and a hydride of a metal selected from the group consisting of hafnium, niobium, tantalum, titanium, vanadium, zirconium and mixtures thereof is hot pressed decomposing the hydride and reacting the resulting metal with carbon producing a polycrystalline microcomposite comprised of a continuous phase of the carbide of the metal which encapsulates at least about 20% by volume of the ceramic particles and which either encapsulates or is intermixed with the balance of said ceramic particles.

11 Claims, 3 Drawing Figures

MICROCOMPOSITE OF METAL CARBIDE AND CERAMIC PARTICLES

This application is a division of application Ser. No. 529,783, filed Sept. 6, 1983, now U.S. Pat. 4,515,746.

The present invention relates to reactive hot pressing and to a polycrystalline microcomposite comprised of a continuous interconnecting phase of metal carbide and a phase of ceramic particles.

The importance of microstructure to the properties of ceramic materials has been amply demonstrated. Properties such as strength, electrical conductivity and thermal conductivity can be significantly affected by grain size, shape and orientation. In the case of multiphase materials the spatial distribution (continuity vs. discontinuity) of phases becomes an important factor in addition to parameters already mentioned. For example, the electrical or thermal conductivity of a composite consisting of one good and one poor conductor can have vastly different values depending on whether or not the conducting phase forms a continuous network.

Each processing technique tends to impart a specific type of microstructure to the finished material. Microstructural parameters can, therefore, be manipulated over a reasonable range by controlling processing parameters. In the case of a ceramic-ceramic (brittle-brittle) composite, the number of applicable processing techniques is fairly limited. They typically involve some method of cold forming (pressing extrusion, injection molding, casting), followed by sintering, hot pressing or isostatic hot pressing. Grain size is controlled by powder preparation, control of the sintering cycle, addition of selected impurities etc. Grain shape can be controlled to some extent by processing techniques, but it is also a function of the material and does not lend itself to control as easily as size. Grain orientation (random vs. preferred) depends on a combination of grain shape and processing techniques. The spatial distribution of phases, on the other hand, seems to be more difficult to control. Obtaining one continuous and one discontinuous phase has been demonstrated in cases of materials with widely different melting points (Si/SiC or alumina/glass).

The present invention utilizes reactive hot pressing, a technique which involves hot pressing a mixture of materials which will undergo some type of chemical reaction during the heat treatment. The resulting material will then have the same overall chemical composition as the starting material, but its phase content will be different. This type of process can have some advantages over classical hot pressing, in that the driving force for the reaction can also aid densification of the material. The chemical reaction will commonly involve some type of material transport, which would also have a tendency to accelerate densification. Due to the extra driving force, it may be possible to sinter materials at temperatures lower than required for standard powder processing. Reactive hot pressing can be particularly advantageous when processing materials which are otherwise difficult to sinter, due either to low diffusion rates or to low surface energy.

More specifically, this invention is directed to a process for forming in a limited class of materials a brittle-brittle composite of controlled geometry useable essentially up to its processing temperature. The starting mixture consists of powders of metal hydride, free carbon and relatively inert ceramic powder mixed together. The ceramic powder should be stable at the processing temperature, and not excessively reactive with the metal carbide phase that is formed in situ.

The mixture is then hot pressed. As the temperature is raised, the yield stress of the metal formed by decomposition of the present metal hydride will be overcome at some point by the pressure applied to the die, forcing the metal to fill interstices and surround the grains of the inert phase, i.e. the ceramic powder. As the temperature is raised further, the carbon will diffuse into the metal and form metal carbide in situ.

A typical example of the present invention is shown in the following reaction:

$$Al_2O_3 + TiH_2 + C = Al_2O_3 + TiC + H_2.$$

Alumina in the above example does not participate to any significant extent in the reaction. It remains as an inert phase while the reaction between the hydride and carbon takes place.

The major advantage of the present method as compared to starting with compounds is that it will yield a polycrystalline microcomposite of hard refractory materials with a continuous metal carbide phase which encapsulates at least about 20% by volume of the ceramic particles and which either encapsulates or is intermixed with the balance of the ceramic particles. The ability to produce this type of geometrical microstructure in a refractory composite is a special feature of the present invention. The continuous metal carbide phase of the present microcomposite will act as a grain growth inhibitor for the grains of the substantially inert phase, i.e. the ceramic powder. The present microcomposite is electrically conducting and has good thermal conductivity since the conducting phase, i.e. the metal carbide phase, is continuous.

Figure 2:
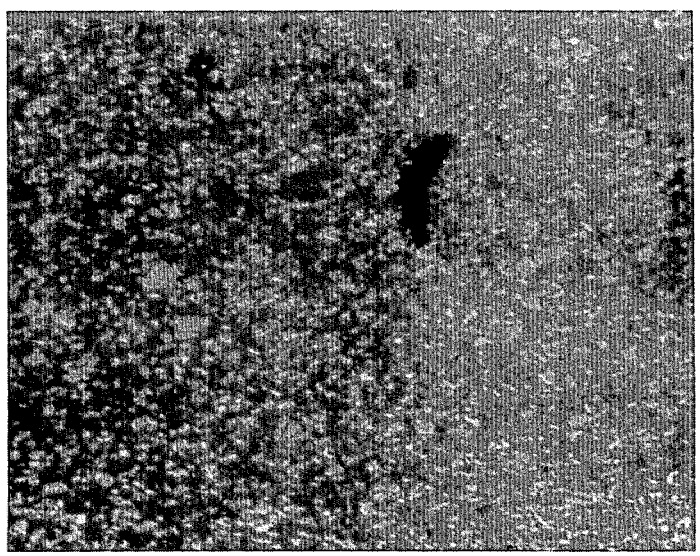
Figure 3:
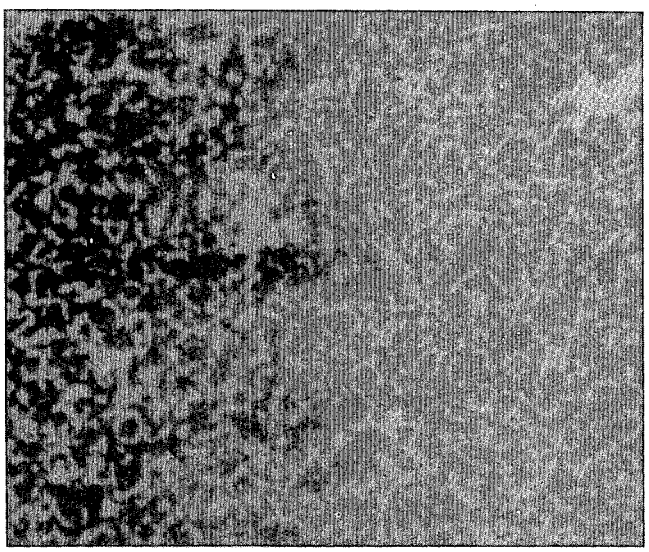

Those skilled in the art will gain a further and better understanding of the present invention from the detailed description set forth below, considered in conjunction with the figures accompanying and forming a part of the specification, in which:

FIG. 1 is a photomicrograph (magnified 1000×) showing the polished cross-section of a microcomposite produced in accordance with the present invention comprised of 77% by volume of $Al_2O_3$ particles (dark phase) and the balance was a continuous interconnecting phase of TiC (light phase);

FIG. 2 is a photomicrograph (magnified 1000×) showing the polished cross-section of a microcomposite produced in accordance with the present invention comprised of about 80% by volume of $Al_2O_3$ particles (dark phase) and the balance was a continuous inteconnecting phase of niobium carbide (light phase); and FIG. 3 is a photomicrograph (magnified 1100×) showing the polished cross-section of a microcomposite produced in accordance with the present invention comprised of 56% by volume of zirconium oxide particles (dark phase) and the balance was a continuous interconnecting phase of zirconium carbide (light phase).

Briefly stated, the present process for producing a microcomposite comprises providing a particulate mixture of elemental or free carbon, a hydride of a metal selected from the group consisting of hafnium, niobium, tantalum, titanium, vanadium, zirconium and mixtures thereof, and a ceramic powder, hot pressing the particulate mixture under a pressure of at least about 200 psi at a temperature ranging from about 1200° C. to about 2000° C. decomposing said metal hydride producing said metal and by-product hydrogen gas which vaporizes away and reacting said metal with said carbon producing the carbide of said metal as a continuous interconnecting phase, said continuous metal carbide phase encapsulating at least about 20% by volume of said ceramic particles, and said continuous metal carbide phase either encapsulating or being intermixed with the balance of said ceramic particles, said process having no significant effect on said ceramic particles, said continuous metal carbide phase formed in situ ranging from about 20% by volume to about 80% by volume of said microcomposite and the balance of said microcomposite being comprised of said ceramic particles.

The present microcomposite is a polycrystalline body comprised of a continuous interconnecting phase of a carbide of a metal selected from the group consisting of hafnium, niobium, tantalum, titanium, vanadium, zirconium, and mixtures thereof and the balance is comprised of ceramic particles, said continuous metal carbide phae encapsulating at least about 20% by volume of said ceramic particles and encapsulating or being intermixed with the balance of said ceramic particles, said microcomposite having a density greater than 95% of the theoretical density for said microcomposite, said continuous metal carbide phase ranging from about 20% by volume to about 80% by volume of said microcomposite.

The theoretical density of the present microcomposite is the average theoretical density for said continuous metal carbide phase and said ceramic particles based on the amounts thereof present.

The present metal hydride is a hydride of a metal selected from the group consisting of hafnium, niobium, tantalum, titanium, vanadium, zirconium and mixtures thereof. The particular metal hydride used depends on the particular continuous interconnecting metal carbide phase desired to be formed in the microcomposite.

In the present process, elemental metal cannot be used instead of the metal hydride since it will react with carbon to form metal carbide before the temperature is reached at which such metal will flow significantly, i.e. about 1150° C. to 1200° C. The formation of such metal carbide in a significant amount below about 1150° C. prevents production of the present microcomposite, and more specifically, prevents production of the present continuous interconnecting phase of metal carbide.

As used herein, elemental or free carbon includes every form of elemental non-diamond carbon and mixtures thereof. Preferably, it is amorphous carbon such as carbon soot, or it is graphite.

The ceramic powder used in the present process as the inert phase in the microcomposite has the characteristic of being stable at the temperatures necessary for processing or it is not significantly affectd by the procesing temperatures. Also, in the present process, the ceramic powder is relatively inert so that the favored reaction will be between the reactants to form the metal carbide in situ. The present process has no significant effect on the ceramic powder.

The particular ceramic powder or mixture of ceramic powders used in the present process depends largely on the particular microcomposite desired, i.e., the particular properties desired in the microcomposite. Representative of the ceramic powder useful in the present invention are the ceramic oxides such as $HfO_2$, $Al_2O_3$, $BeO$, $Cr_2O_3$, $La_2O_3$, $MgO$, $ThO_2$, $UO_2$, $Y_2O_3$, $ZrO_2$, $BaZrO_3$, $BeZr_2O_7$, $ThO_2.ZrO_2$, $ZrO_2$, and mixtures and solid solutions thereof.

Also useful as the ceramic powder in the present process are the ceramic carbides such as the carbides of boron, hafnium, niobium, tantalum, titanium, vanadium, zirconium, and mixtures and solid solutions thereof.

Still other useful ceramic powders are the ceramic borides such as the borides of hafnium, niobium, tantalum, titanium, vanadium, zirconium, and mixtures and solid solutions thereof. More specifically, representative of the borides are $HfB_2$, $NbB$, $NbB_2$, $TaB$, $TaB_2$, $TiB_2$, $VB$, $VB_2$ and $ZrB_2$.

In carrying out the present process, a particulate uniform or at least a substantially uniform mixture or dispersion of the metal hydride, carbon and ceramic powder is formed. The components of the mixture can be of commercial or technical grade. Specifically, they should not contain any impurities which would have a significantly deleterious effect on the properties of the resulting microcomposite, and preferably, the components are at least about 99% pure.

The amounts of metal hydride and carbon in the particulate mixture depends on the amount of continuous metal carbide phase to be formed in the microcomposite. In the present process, the metal hydride decomposes producing the metal in situ and hydrogen gas which vaporizes away. The metal deforms and flows around the ceramic particles reacting with the carbon to produce the present metal carbide phase which encapsulates at least about 20% by volume of the ceramic particles.

The metal hydride and free carbon are used in the amounts required to react to form the continuous phase of metal carbide of the desired stoichiometry ranging from about 20% by volume to about 80% by volume of the total volume of the microcomposite. The amount of free carbon with respect to the metal hydride can be stoichiometric or substoichiometric, but preferably, it is stoichiometric. Preferably, for use as a cutting tool, the continuous metal carbide phase formed in situ ranges from about 20% by volume to about 30% by volume of the total volume of the microcomposite.

The amount of the ceramic powder used also depends on the particular microcomposite desired. In the present process, it is used in an amount which produces a microcomposite wherein the phase of ceramic particles ranges from about 20% by volume to about 80% by volume of the total volume of the microcomposite. Preferably, for use of the microcomposite as a cutting tool, the ceramic powder is used in an amount which produces a microcomposite wherein the phase of ceramic particles ranges from about 70% by volume to about 80% by volume of the microcomposite.

The ceramic powder, free carbon and metal hydride can be admixed by a number of techniques such as, for example, ball milling, vibratory milling or jet milling, to produce a significantly or substantially uniform or homogeneous dispersion or mixture. The more uniform the mixture, the more uniform is the microstructure, and therefore, the properties of the resulting microcomposite body.

Representative of these mixing techniques is ball milling, preferably with balls of material such as $\alpha$-$Al_2O_3$ which has low wear and which has no significant detrimental effect on the properties desired in the final product. If desired, such milling can also be used to break down any agglomerates and reduce all materials to comparable particle sizes. Milling may be carried out dry or with the charge suspended in a liquid medium inert to the ingredients. Typical liquids include ethyl alcohol and carbon tetrachloride. Milling time varies widely and depends largely on the amount and particle size reduction desired and type of milling equipment. In general, milling time ranges from about 1 hour to about 100 hours. Wet milled material can be dried by a number of conventional techniques to remove the liquid medium.

The metal hydride and ceramic powder in the present particulate mixture have an average particle size of less than about 15 microns, preferably less than about 10 microns, and most preferably their average particle size is about 1 micron or less. The free carbon in the present particulate mixture preferably has an average particle size which is about 1 micron or less.

Hot pressing of the particulate mixture is carried out in a non-oxidizing atmosphere. More particularly, hot pressing of the particulate mixture is carried out in a protective atmosphere in which the mixture is inert or substantially inert, i.e. an atmosphere which has no significant deleterious effect on it. Representative of the hot pressing atmospheres is nitrogen, argon, helium or a vacuum. The hot pressing atmosphere can range from a substantial vacuum to atmospheric or ambient pressure.

In carrying out the present process, the particulate mixture is hot pressed under a pressure and temperature and for a sufficient period of time to produce the present microcomposite. Hot pressing temperature ranges from about 1200° C. to about 2000° C. Temperatures lower than about 1200° C. are not sufficiently high to allow formation of the present continuous phase of metal carbide which encapsulates at least about 20% by volume of the ceramic particles. On the other hand, temperatures above 2000° C. favor rapid growth of particles or grains and undesirable reactions. The particular hot pressing temperature depends largely on the particular metal carbide phase to be formed, and preferably, it ranges from about 1500° C. to about 1800° C.

The heating rate to the present hot pressing temperature should be sufficiently rapid to prevent decomposition of the metal hydride to any significant degree below about 1100° C. and thereby prevent any significant formation of metal carbide below about 1200° C. Such heating rate may be as low as about 30° C. per minute, but preferably, it is at least about 50° C. per minute, and most preferably it is about 100° C. per minute. The maximum heating rate in the present process is limited only by the equipment. The formation of metal carbide in a significant amount below about 1200° C. prevents production of the present continuous phase of metal carbide which encapsulates at least about 20% by volume of the ceramic particles.

The hot pressing pressure can vary and should be at least sufficient to confine the material in the hot press and make the metal carbide reaction take place during the present reactive hot pressing. Generally, the minimum hot pressing pressure is about 200 psi and preferably it is about 500 psi. Hot pressing pressure can range to a maximum pressure which is limited by the available pressing equipment. Most preferably, hot pressing pressure ranges from about 1000 psi to about 8000 psi.

In the present process, there is no significant loss of ceramic powder or of the reactants forming the continuous phase of metal carbide, i.e. the reactant metal formed in situ and the reactant carbon.

The present polycrystalline microcomposite is comprised of a continuous interconnecting phase of the present metal carbide and a phase of the present ceramic particles. The phases are distributed uniformly, substantially uniformly or at least significantly uniformly in the microcomposite. The microcomposite has a uniform, substantially uniform or at least a significantly uniform microstructure.

The phase of ceramic particles in the present microcomposite is comprised of individual grains as well as clusters of the grains. Ordinarily, a cluster is comprised of less than about 10 grains. Generally, more than about 50% by volume and preferably more than about 90% by volume of the ceramic particles in the microcomposite is comprised of individual ceramic grains and the balance is comprised of clusters.

In the present microcomposite, the ceramic particles have an average particle size of less than about 15 microns, preferably less than about 10 microns, more preferably, less than about 5 microns, and most preferably, it is about 1 micron.

In the present microcomposite, the metal carbide phase formed in situ has an average grain size of less than about 15 microns, preferably less than about 10 microns, more preferably less than about 5 microns and most preferably it is about 1 micron or less.

In the present microcomposite the continuous metal carbide phase formed in situ encapsulates at least about 20% by volume, preferably at least about 50% by volume, and most preferably more than 90% by volume of the ceramic particles. By such encapsulation, it is meant that the metal carbide phase formed in situ encapsulates the individual ceramic grains and/or it encapsulates the individual cluster of ceramic grains.

Preferably, the present microcomposite has a density greater than 98% and more preferably greater than 99% of the theoretical density for the microcomposite.

Since the present microcomposite has a continuous interconnecting network of the present metal carbide, it is electrically conducting. It is expected that the present microcomposite would have an electrical conductivity at least about 20% higher than that of a composite of the same composition produced by conventional hot pressing of mixtures of ceramic powders and metal carbide powders.

For most applications, the volume fraction of ceramic particles in the present microcomposite ranges from about 45% to about 80%. For use as a cutting tool, the volume fraction of ceramic particles in the present microcomposite ranges from about 70% to about 8%. Also, preferably, for use as a hard cutting tool, the present microcomposite is comprised of alumina particles and titanium carbide.

The particular composition, grain or particle size of the present microcomposite depends largely on its application. The present product is useful as a general wear part such as a nodule or a guide pin. It could be useful as a high temperature electrode material. It is particularly useful as a cutting medium. Specifically, the present product is useful as a tool insert which, for example, can be held by a tool shank adapted to be held in a machine tool whereby it can be used for direct machining.

The invention is further illustrated by the following examples where the following procedure was used unless otherwise noted:

All heating and cooling was carried out under the given constant pressure. All cooling was furnace cooling to room temperature.

All of the heating and cooling was carried out under a protective atmosphere of nitrogen gas.

Rockwell A hardness ($R_A$) was determined according to ASTM Designation: E 18-74.

EXAMPLE 1

A mixture of 80% by weight (about 77% by volume) of $Al_2O_3$ powder with an average particle size of about $0.3\mu$, 16% by weight of titanium hydride with an average particle size of about $2\mu$, and 4% by weight of carbon black with an average particle size of about $1\mu$, was ball milled with cemented tungsten carbide balls in acetone at room temperature for 16 hours in a plastic container. The mixture was milled in acetone to prevent excessive oxidation and to insure proper dispersion of powder. The resulting milled particulate mixture was dried in air at room temperature. The dried particulate mixture appeared to have an average particle size which was about submicron.

The dried particulate mixture was compressed in a steel die at room temperature to about 15000 psi. The resulting compact was in the form of a pellet approximately ½ inch in diameter. The pellet was inserted into a high strength graphite die heated under a constant pressure of about 5000 psi in 20 minutes to 1600° C., held at temperature for five minutes, unloaded, i.e. the pressure was released, and furnace-cooled to room temperature.

A polished cross-section of the resulting polycrystalline microcomposite is shown in FIG. 1 where the $Al_2O_3$ particles are the dark colored phase. Metallographic examination of the polished cross-section showed a fully densified structure, i.e. it had a density greater than about 99% of the theoretical density for the microcomposite. The microcomposite was comprised of about 77% by volume of $Al_2O_3$ phase and the balance was titanium carbide phase. Both phases were distributed substantially uniformly in the microcomposite. The titanium carbide phase was continuous, interconnecting and encapsulated about 50% by volume of the $Al_2O_3$ particles. The balance of the $Al_2O_3$ particles was intermixed with the titanium carbide phase and a large fraction of such balance of $Al_2O_3$ particles was interconnecting.

The average particle size of the $Al_2O_3$ particles in the microcomposite was submicron. The average grain size of the titanium carbide phase was about 2 microns or less.

The microcomposite would be useful as a cutting tool.

EXAMPLE 2

A mixture of 68.6% by weight (80% by volume) $Al_2O_3$ powder with an average particle size of about $0.3\mu$, 28.3% by weight of −200 mesh niobium hydride and 3.1% by weight of carbon black was ball milled in acetone at room temperature with cemented tungsten carbide balls for 60 hours in a plastic container. The milled mixture was dried in air at room temperature. In the dried particulate mixture, the niobium hydride had an average particle size of less than about 5 microns, and the carbon black was submicron.

The dried particulate mixture was pressed into a pellet in substantially the same manner as disclosed in Example 1 and was of substantially the same size.

The pellet was hot pressed in substantially the same manner as disclosed in Example 1 except that it was heated at 1510° C. under a constant pressure of about 5000 psi and held at 1510° C. for about 1 minute and then furnace-cooled under the constant pressure of 5000 psi to room temperature.

A polished cross-section of the resulting polycrystalline microcomposite is shown in FIG. 2 where the $Al_2O_3$ particles are the dark phase. Metallographic examination of the polished cross-section showed a completely dense structure, i.e. it had a density greater than 99% of the theoretical density for the microcomposite.

The microcomposite was comprised of about 80% by volume of $Al_2O_3$ phase and the balance was niobium carbide phase. The phases were distributed substantially uniformly in the microcomposite. The niobium carbide phase was continuous, interconnecting and encapsulated about 60% by volume of the $Al_2O_3$ particles and was intermixed with the balance of the $Al_2O_3$ particles.

The average size of the $Al_2O_3$ particles in the microcomposite was submicron and that of the niobium carbide phase was less than about 5 microns.

The microcomposite would be useful as a cutting tool.

EXAMPLE 3

A milled dried particulate mixture comprised of 20% by weight (15% by volume) $Al_2O_3$, 64% by weight titanium hydride and 16% by weight carbon black was produced in the same manner as disclosed in Example 1 and appeared to have an average particle size which was submicron.

The mixture was pressed into a compact in the form of a pellet in the same manner as disclosed in Example 1.

The compact was hot pressed in the same manner as disclosed in Example 2 except that it was heated under a constant pressure of 5000 psi in 10 minutes to a sintering temperature of 1790° C., held at 1790° C. for 8 minutes, and then furnace-cooled to room temperature.

Metallographic examination of a polished cross-section of the resulting microcomposite showed some porosities and poorly sintered regions but a major portion of the microcomposite was densified satisfactorily, i.e. about 80% by volume of the microcomposite had a density greater than 95% of the theoretical density for the microcomposite.

EXAMPLE 4

A mixture of 69.5 weight % of $Al_2O_3$ having an average particle size of about $0.3\mu$, 24 weight percent of Ti-hydride having an average particle size of about $2\mu$, 6 weight % carbon (carbon black) with an average particle size of about 1 micron, and 0.5 weight % MgO was ball milled for 60 hours. The material was dry milled in a plastic jar using high purity $Al_2O_3$ balls as the grinding media. The resulting particulate mixture was uniform and had an average particle size which appeared to be submicron.

Twelve grams of the milled powder mixture was pressed at room temperature into a slug in a ¾″ inner diameter steel die at a pressure of 40Kpsi. The pressed slug was transferred to a graphite heating die of the same internal diameter. The entire die assembly was then inserted into an induction heated hot-press apparatus.

The slug was heated under a constant pressure of 6000 psi in 15 minutes to 1750° C., held at 1750° C. for 30 minutes, unloaded and furance cooled to room temperature.

The resulting Al$_2$O$_3$—TiC product, i.e. polycrystalline microcomposite, had a very dense, pore free microstructure, i.e. it had a density greater than about 99% of the theoretical density for the microcomposite. Hardness of the microcomposite was found to be R$_A$ 94.

The hot-pressed slug was shaped into a ⅜" round × 3/16" thick cutting tool, to be evaluated by machining Inconel 718 nickel based alloy (R$_c$ 43–45).

The machining test conditions were as follows: speed 700 SPM, feed 0.005 in., depth of cut 0.050 in.

The shaped slug cut for 5 minutes, which is comparable to commercially available ceramics also tested at these conditions.

Metallographic examination of a polished cross-section of the hot pressed slug, i.e. microcomposite, showed that it was comprised of a continuous interconnecting phase of titanium carbide which encapsulated about 60% by volume of the Al$_2$O$_3$ particles and which was intermixed with the balance of the Al$_2$O$_3$ particles. The average particle size of the Al$_2$O$_3$ particles was submicron. The average grain size of the titanium carbide phase was about 2 microns.

Other experiments have shown that the MgO appeared not to be required to prevent grain growth.

EXAMPLE 5

A mixture of 59 weight % (56% by volume) of ZrO$_2$, 36.4 weight % of zirconium hydride, 3.6 weight % of carbon black, and 1.0 weight % of MgO was ball milled for 72 hours. The powder was milled in a plastic jar filled with high purity ZrO$_2$ balls. No solvent was used. The resulting particulate mixture appeared to have an average particle size which was submicron.

The milled powder was pressed in a steel die at room temperature to a cylindrical disc at a pressure of 70Kpsi, and transferred into the cavity of a graphite die. The graphite die with the sample disc was placed in a hot press, heated to 1710° C., and kept under a constant pressure of 8000 psi throughout the heating and cooling cycle. The system reached 1710° C. in 20 minutes and was kept at 1710° C.±10° C. for 24 minutes. The induction power supply was turned off at this point.

A polished cross-section of the resulting polycrystalline microcomposite is shown in FIG. 3 where the ZrO$_2$ particles are the dark phase and the zirconium carbide is the light phase. Metallographic examination of the polished cross-section showed that it was fully densified, i.e. it had a density greater than about 99% of the theoretical density for the microcomposite.

The microcomposite was comprised of about 56% by volume of ZrO$_2$ particles and the balance was a continuous interconnecting phase of zirconium carbide which encapsulated about 60% by volume of the ZrO$_2$ particles and which was intermixed with the balance of the ZrO$_2$ particles. The phases were distributed substantially uniformly in the microcomposite.

The ZrO$_2$ particles in the microcomposite had an average particle size of about 5 microns, and the zirconium carbide grains had an average grain size of about 5 microns indicating that grain growth had occurred in this instance.

EXAMPLE 6

A mixture of 66 weight % Al$_2$O$_3$, 26 weight % Tihydride, 5.5 weight % carbon black, 2 weight % TiO$_2$ and 0.5 weight % MgO was ball milled for 72 hours at room temperature. The material was dry milled in a plastic container using high purity Al$_2$O$_3$ balls as the grinding media. The resulting particulate mixture had an average particle size which appeared to be submicron.

Twelve grams of the milled particulate mixture was die pressed at room temperature to a cylindrical shape in a 0.955 diameter steel die at a pressure of 40Kpsi. The resulting pressed slug was transferred to a graphite heating die of the same internal diameter and then the entire die assembly was inserted into the hot-press apparatus. The sample was heated in 20 minutes to 1750° C. in a nitrogen atmosphere under constant pressure of 6000 psi and held at temperature for 15 minutes, then furnace cooled.

Metallographic examination of a polished cross-section of the resulting polycrystalline microcomposite showed a nearly pore free structure, i.e. the microcomposite had a density greater than 99% of its theoretical density.

The microcomposite was comprised of about 58% by volume of Al$_2$O$_3$ particles and the balance was a continuous interconnecting phase of titanium carbide which encapsulated about 60% by volume of the Al$_2$O$_3$ particles and which was intermixed with the balance of the Al$_2$O$_3$ particles.

The phases were distributed substantially uniformly in the microcomposite. The Al$_2$O$_3$ particles had an average particle size which was submicron and the titanium carbide phase had an average grain size of about 2 microns.

The microcomposite would be useful as a cuttiing tool. Hardness of the material was recorded at R$_A$ 93.6.

In copending U.S. patent application Ser. No. 529,784 entitled MICROCOMPOSITE OF METAL BORIDE AND CERAMIC PARTICLES, filed Sept. 6, 1983, now U.S. Pat. No. 4,512,946 in the names of Milivoj Konstantin Brun, Minyoung Lee and Lawrence Edward Szala and assigned to the assignee hereof and incorporated herein by reference, there is disclosed that a particulate mixture of ceramic powder, boron and a hydride of a metal selected from the group consisting of hafnium, niobium, tantalum, titanium, vanadium, zirconium and mixtures thereof is hot pressed decomposing the hydride and reacting the resulting metal with boron producing a polycrystalline microcomposite comprised of a continuous phase of the boride of the metal which encapsulates at least about 20% by volume of the ceramic particles and which either encapsulates or is intermixed with the balance of said ceramic particles.

What is claimed is:

1. An electrically conducting polycrystalline microcomposite consisting essentially of a continuous interconnecting phase of a carbide of a metal selected from the group consisting of hafnium, niobium, tantalum, titanium, vanadium, zirconium and mixtures thereof and a phase consisting essentially of ceramic particles, said continuous metal carbide phase encapsulating at least about 20% by volume of said phase of ceramic particles and encapsulating or being intermixed with the balance of said ceramic particles, said metal carbide phase having an average grain size of less than about 15 microns, said ceramic particles having an average particle size of less than about 15 microns and consisting essentially of ceramic grains and clusters of grains, all of said encapsulating metal carbide phase encapsulating individual ceramic grains and/or individual clusters of grains, said microcomposite having a density greater than 95% of the theoretical density for said microcomposite, said continuous metal carbide phase ranging from about 20% by volume to about 80% by volume of said microcomposite.

2. The polycrystalline microcomposite according to claim 1 wherein said continuous metal carbide phase is hafnium carbide.

3. The polycrystalline microcomposite according to claim 1 wherein said continuous metal carbide phase is niobium carbide.

4. The polycrystalline microcomposite according to claim 1 wherein said continuous metal carbide phase is tantalum carbide.

5. The polycrystalline microcomposite according to claim 1 wherein said continuous metal carbide phase is titanium carbide.

6. The polycrystalline microcomposite according to claim 1 wherein said continuous metal carbide phase is vanadium carbide.

7. The polycrystalline microcomposite according to claim 1 wherein said continuous metal carbide phase is zirconium carbide.

8. The polycrystalline microcomposite according to claim 1 wherein said metal carbide phase ranges from about 20% by volume to about 30% by volume of said microcomposite and encapsulates more than about 90% by volume of said ceramic particles.

9. An electrically conducting polycrystalline microcomposite consisting essentially of a continuous phase of titanium carbide and a phase consisting essentially of ceramic particles, said continuous titanium carbide phase encapsulating at least about 20% by volume of said phase of ceramic particles and encapsulating or being intermixed with the balance of said ceramic particles, said titanium carbide phase having an average grain size of less than about 5 microns, said ceramic particles having an average particle size of less than about 5 microns and consisting essentially of ceramic grains and clusters of grains, all of said encapsulating titanium carbide phase encapsulating individual ceramic grains and/or individual clusters of grains, said microcomposite having a density greater than 98% of the theoretical density for said microcomposite, said continuous titanium carbide phase ranging from about 20% by volume to about 30% by volume of said microcomposite.

10. The microcomposite according to claim 9 wherein said ceramic particles are $Al_2O_3$.

11. An electrically conducting polycrystalline microcomposite consisting essentially of a continuous interconnecting phase of a carbide of a metal selected from the group consisting of hafnium, niobium, tantalum, titanium, vanadium, zirconium and mixtures thereof and a phase consisting essentially of ceramic particles, said continuous metal carbide phase encapsulating more than about 90% by volume of said ceramic particles and encapsulating or being intermixed with the balance of said ceramic particles, said metal carbide phase having an average grain size of less than about 5 microns, said ceramic particles having an average particle size of less than about 5 microns and consisting essentially of ceramic grains and clusters of grains, all of said encapsulating metal carbide phase encapsulating individual ceramic grains and/or individual clusters of grains, said microcomposite having a density greater than 98% of the theoretical density for said microcomposite, said phase of ceramic particle ranging from about 45% by volume to about 80% by volume of said microcomposite.

* * * * *